United States Patent [19]

Rice

[11] 4,081,636
[45] Mar. 28, 1978

[54] DIFFERENTIAL PRESSURE CUTOUT SWITCH

[75] Inventor: Paul Patrick Rice, Elkhart, Ind.

[73] Assignee: Johnson Controls, Inc., Milwaukee, Wis.

[21] Appl. No.: 663,621

[22] Filed: Mar. 3, 1976

[51] Int. Cl.² .......................................... H01H 35/34
[52] U.S. Cl. .................................. 200/83 Y; 200/83 J
[58] Field of Search ............ 200/81 R, 81.5, 144 AP, 200/83 R, 83 A, 83 J, 83 S, 83 Y; 73/205 R, 398 AR, 407 R; 340/240; 116/117 R, DIG. 7

[56] References Cited

U.S. PATENT DOCUMENTS

| 2,623,963 | 12/1952 | Wolfe | 200/243 |
|---|---|---|---|
| 3,007,017 | 10/1961 | Dwyer | 200/83 A |
| 3,363,072 | 1/1968 | Moody | 200/81.5 |
| 3,525,262 | 8/1970 | Goran | 73/398 AR |
| 3,577,208 | 5/1971 | Petrick | 200/144 AP |
| 3,591,051 | 7/1971 | Mitchell | 200/83 A |
| 3,676,622 | 7/1972 | Brumbelow | 200/144 AP |
| 3,859,484 | 1/1975 | Nelson | 200/83 Y |

FOREIGN PATENT DOCUMENTS 1,051,359   2/1959   Germany ........................ 200/83 Y Primary Examiner—Gerald P. Tolin
Attorney, Agent, or Firm—Emrich, Root, O'Keeffe & Lee

[57] ABSTRACT

A differential pressure cutout switch including a low pressure operating point assembly and a high pressure operating point assembly which are mechanically linked and are operable to respond to first and second pressures supplied over respective first and second pressure inlets of the switch to control a contactor switch assembly which is movable to a first position to provide an open circuit between outputs of the switch and movable to a second position to connect a resistance of a finite value between the outputs as a function of the difference between the two pressures. The differential pressure cutout switch is described with reference to an application in a protection control system for monitoring lubrication oil pressure for a compressor of a refrigeration system.

17 Claims, 11 Drawing Figures

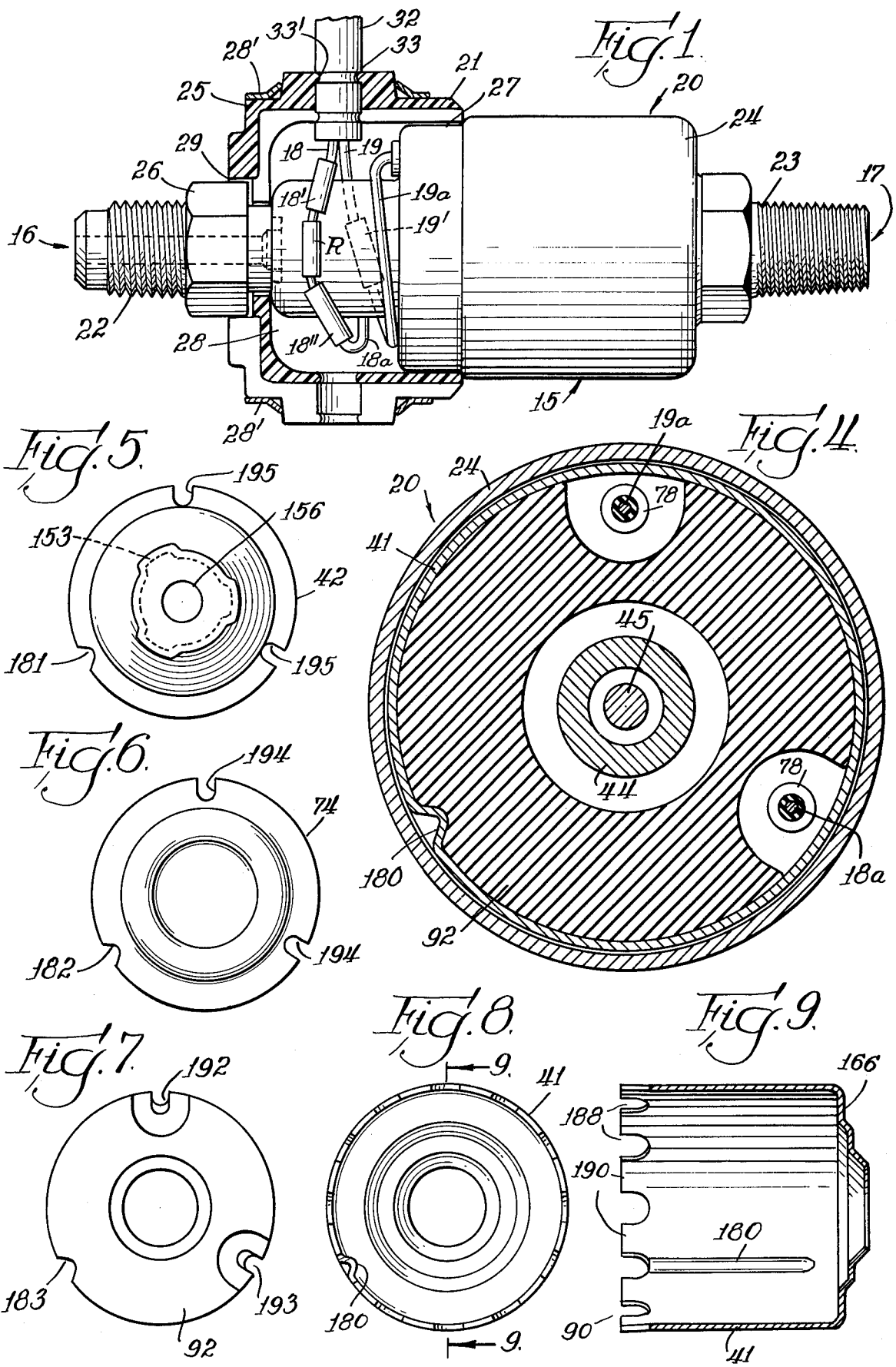

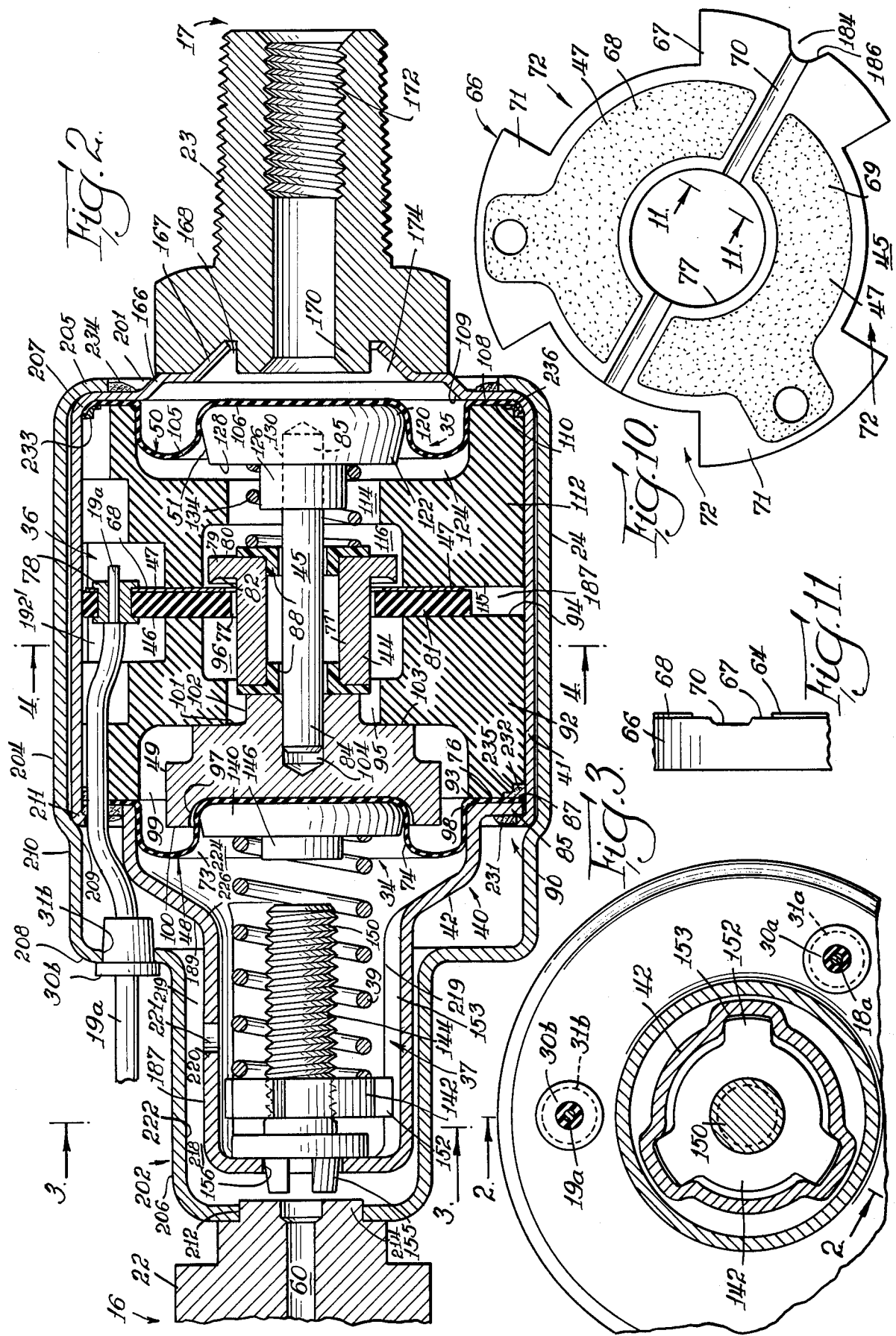

DIFFERENTIAL PRESSURE CUTOUT SWITCH

BACKGROUND OF THE INVENTION

1. Field of the Invention

This invention relates to protection controls, and more particularly to a differential pressure sensing apparatus for monitoring two pressures and for providing a control output whenever the difference between the pressures reaches a preselected value.

2. Description of the Prior Art

Proper lubrication is a major concern in machines with high-speed moving parts or with heavy loading of bearings or both. Accordingly, lubrication oil protection controls have become widely used in apparatus, such as compressors for refrigeration and air conditioning systems, to detect the condition of inadequate lubrication and effect shut down of the compressor for such conditions.

The need for such lube oil protection controls is readily apparant when one considers that the compressors are usually required to run hour after hour, day after day, unattended, and without such controls, continued operation of a compressor with improper lubrication would result in damage to the compressor.

One reason for low oil pressure is that if there is no oil in the compressor crankcase, the oil pump cannot deliver oil to the bearings and other wearing surfaces. Other common causes of low oil pressure include the presence of liquid refrigerant in the compressor crankcase, oil pump failure, or an inoperative pressure relief valve or pressure regulating valve in the lubrication oil system, for example.

Accordingly, pressure sensing controls have been developed for the purpose of monitoring oil pressures for compressors of refrigeration or air conditioning units and the like.

Since the refrigeration system is a sealed system, then when the refrigeration compressor is idle, the oil pump pressure and the compressor crankcase oil pressure are generally the same. When the compressor is running, the oil pump pressure increases and the crankcase oil pressure decreases, and only if the lubrication system is not performing properly will these two pressures remain the same or nearly the same with the compressor running.

The difference between these two pressures, commonly termed "differential pressure" is usually monitored by a differential pressure sensing device as a way of determining if proper lubrication is provided for the compressor. Typically, such device responds to a differential pressure at least equal to a set value to maintain the compressor operating. The device responds to a differential pressure below the set value to effect the operation of a switch which causes the deenergization of the compressor, such as by de-energizing the coil of a motor contactor.

However, once an under pressure condition is sensed, such thermal switches require a time delay, typically one or two minutes before effecting deactivation of the compressor. Also, the timing is affected by ambient temperatures and voltage variations.

Moreover, in recent years, with the development of smaller, more compact compressors and motor compressor assemblies, there has been a demand for smaller, more compact controls which provide such differential pressure monitoring function.

SUMMARY OF THE INVENTION

It is an object of the present invention to provide a new and improved differential pressure cutout switch for use in a protection control system.

It is another object of the invention to provide a differential pressure cutout switch for use in a closed system and including first and second pressure diaphragms and which provides continued operation of the switch in the event of a leak condition for one of the diaphragms and provides fluid retention within the system in the event both diaphragms rupture.

Another object of the invention is to provide a differential pressure cutout switch for monitoring first and second pressures and which is operable to provide an infinite resistance between outputs thereof in response to a first difference between the first and second pressures and to provide a resistance of a finite value between the outputs in response to a second difference between the first and second pressures.

Yet another object of the invention is to provide a differential cutout switch for use in monitoring lubrication oil pressure of a compressor of a refrigeration or air conditioning system and which provides a control output permitting distinguishing between adequate, marginal and inadequate lubrication pressure levels for the compressor.

These and other objects are achieved by the present invention which has provided a differential pressure cutout switch which responds to a predetermined difference between fluid pressures provided at first and second pressure inlets thereof to provide a control output function. The pressure cutout switch includes contactor switch means disposed within a switch chamber defined by a low pressure operating point assembly means and a high pressure operating point assembly means, mechanically linked together and which control operation of the contactor switch means. The switch means includes a contact plate bearing electrical contacts, and a contactor member movable relative to the contact plate and having one end disposed adjacent the low pressure operating point assembly means and the other end mechanically linked to the high pressure operating assembly means. The electrical contacts are connected to outputs of the pressure cutout switch.

Fluid at a first pressure introduced into a first inlet of the pressure cutout switch is directed to a low pressure diaphragm of the low pressure operating point assembly means. Fluid at a second higher pressure introduced into a second inlet of the pressure cutout switch is directed to a high pressure diaphragm of the high pressure operating point assembly means. When the difference between the two pressures is equal to a predetermined value, the contactor member is moved to engage the contacts to complete a circuit and connect a resistance of a finite value between the outputs of the pressure cutout switch. When the differential pressure is less than the predetermined value, the contactor member is moved out of engagement with the contacts providing an open circuit or infinite resistance between the outputs of the pressure cutout switch.

The differential pressure cutout switch includes pressure range adjust means which permits preselection of the differential pressure at which the switch operates to connect the resistance between its outputs.

In accordance with a feature of the invention, the low pressure diaphragm and the high pressure diaphragm provide fluid isolation to the contactor assembly thereby preventing contamination of the switch contacts under normal operating conditions. In addition, the switch contacts are self-healing thereby minimizing the effects of arcing as may occur during switching operations.

The pressure sensing switch, when employed in a closed system such as a refrigeration or air conditioning system, provides a fluid retention within the system in the event one or both of the diaphragms should rupture. In addition, the switch provides operation in the event that one of the diaphragm leaks. Thus, if either diaphragms ruptures, normal operation continues unless or until the electrical contacts become contaminated to a degree that circuit closure cannot occur. If both diaphragms rupture, the fluid is not lost to atmosphere and the switch permits restricted flow from the high pressure inlet to the low pressure inlet.

Also, since the diaphragms provide an air-tight seal for the contactor assembly means within the switch assembly, the contactor assembly means remains in the atmosphere it was sealed in, and pressure variations caused by ambient temperatures are cancelled by acting on both diaphragms.

The differential pressure cutout switch is a very exact switch and operates to connect the finite resistance across its outputs or to disconnect the resistance from its outputs at exactly the same point. Also, the output function provided by the differential pressure cutout switch is suitable for use as an input to electronic controllers, enabling fast response to low pressure levels as could cause damage to apparatus being monitored by the differential pressure cutout switch. For example, in accordance with a disclosed embodiment, the pressure cutout switch is described with reference to an application in a protection control system for monitoring lubrication oil pressure for a compressor of a refrigeration or air conditioning system, and for effecting the deactivation of the compressor whenever the lubrication oil pressure decreases below a given value.

Moreover, when the differential pressure cutout switch is employed with an electronic sensor controller which responds to the presence of a resistance of a finite value or an open circuit between inputs thereof for controlling an apparatus, such as a compressor, the pressure sensing function is "cheat-proof" as the controller discriminates between normal operating conditions and open or short circuit conditions for leads which connect the pressure cutout switch to the controller.

These and other objects and advantages will be become apparent from the following description of the differential pressure cutout switch which makes reference to the following drawings.

DESCRIPTION OF THE DRAWINGS

FIG. 1 is a side elevational view, partially in section, of a differential pressure sensing switch provided by the present invention;

FIG. 2 is a sectional side elevational view of a pressure sub-assembly of the sensing switch shown in FIG. 1;

FIG. 3 is a sectional view taken along lines 3—3 of FIG. 2;

FIG. 4 is a sectional view taken along lines 4—4 of FIG. 2;

FIG. 5 is an end view of a range spring housing of the sub-assembly shown in FIG. 2;

FIG. 6 is a plan view of a pressure diaphragm of the sub-assembly shown in FIG. 2;

FIG. 7 is an end view of a spacer member of the sub-assembly of FIG. 2;

FIG. 8 is an end view of a pressure housing of the sub-assembly of FIG. 2;

FIG. 9 is a sectional view taken along lines 9—9 of FIG. 8;

FIG. 10 is a plan view of a contact plate of the sub-assembly shown in FIG. 2; and FIG. 11 is a sectional view of a portion of the contact plate taken along lines 11—11 of FIG. 10.

DESCRIPTION OF PREFERRED EMBODIMENTS

Referring to FIG. 1, the differential pressure cutout switch 15 provided by the present invention includes a pressure sub-assembly 20 and a housing 21, shown in section, which encloses a portion of the pressure sub-assembly 20 adjacent one end thereof which serves as a low pressure inlet 16. The differential pressure cutout switch 15 responds to the difference in pressures of fluid at low pressure which is supplied to the switch 15 over the low pressure inlet 16 and fluid at a higher pressure which is supplied to the switch 15 by way of a high pressure inlet 17 to provide a control output whenever the difference between the pressures is at least a given value. In the exemplary embodiment, the switch 15 is operable to connect a resistance of a finite value into an output circuit of the switch 15 provided by leads 18 and 19 whenever the differential pressure is at least equal to the selected value, and to cut the resistance out of the output circuit whenever the differential pressure is less than the selected value. Although the pressure cutout switch 15 is preferably employed in applications where it is desired to monitor differential pressure, with modification, the switch 15 may be operable to respond to a single pressure to provide the control function whenever the monitored pressure reaches a predetermined value.

For purposes of illustration of the invention, the differential pressure cutout switch 15 is described with reference to an application for monitoring oil pressures of a compressor unit of a refrigeration or air conditioning system. In such application, the low pressure inlet 16 is connected to an outlet of the compressor crankcase, and the high pressure inlet 17 is connected to an outlet of the oil pump of the compressor.

The leads 18 and 19 which comprise the output circuit of the switch 15 are connectable to a control device which responds the change in resistance provided between leads 18 and 19 by the switch 15 to control the operation of the compressor such as by energizing or deenergizing a contactor coil of the compressor motor as a function of the resistance sensed at the output of the switch 15. The pressure sensing switch 15 is set to respond to a given difference between oil pump pressure and the crankcase oil pressure, indicative of adequate lube oil pressure for the compressor to connect the resistance into the output circuit of the switch 15 provided by leads 18–19, enabling the control device to effect the energization of the compressor motor. The switch 15 is disabled, providing an open circuit or infinite resistance between the output leads 18–19 whenever the differential pressure is less than the given value, enabling the control device to deenergize the motor, thereby shutting down the compressor.

One control device which is suitable for this purpose includes an electronic sensor controller, including a pressure discriminator which responds to the presence of an infinite resistance (open circuit condition) or a resistance of a finite value between inputs thereof to control the operation of a compressor. The pressure discriminator is operable when enabled to integrate the time for which an open circuit condition exists between its input terminals and to effect the deenergization of the compressor whenever the time exceeds a certain value. Thus, the sensor controller provides a delay for start up, permitting the compressor to start at low lube pressure. However, if proper lubrication pressure fails to be provided within the integration time of the pressure discriminator, the pressure discriminator times out and effects the deenergization of the compressor. If proper lube oil pressure is provided before the pressure discriminator times out, the sensor controller maintains the compressor operating.

Considering the pressure sensing switch 15 in more detail, the pressure sub-assembly 20 includes an outer housing or shell member 24 having a low pressure fitting 22 secured thereto adjacent the low pressure inlet 16, and a high pressure fitting 23 secured thereto adjacent the high pressure inlet 17. The housing 21 which encloses one end of the sub-assembly 20 adjacent the low pressure inlet 16, may be of a plastic material and is split, forming two identical sections, such as section 25 shown in FIG. 1, which can be molded from a common mold. The two sections of the housing 21 are held together by push nuts 28' when the housing 21 is assembled on the sub-assembly 20.

The housing 21 is shaped to index and lock underneath a hex nut 26 of the low pressure fitting 22, which passes through an open end 29 of the housing 21. The housing 21 also fits around a shoulder 27 of the outer shell member 24. The housing 21 provides a cavity 28 adjacent the low pressure inlet fitting 22 in which the leads 18 and 19, which extend to the control device of sensor controller, are connected to the resistance R and to lead portions 18a and 19a which are connected to a contactor or switching assembly of the pressure sub-assembly 20. The lead portions 18a and 19a extend through bushings 30a and 30ib, shown in FIGS. 2 and 3, for lead portions 18a and 19a, which are disposed in apertures 31a and 31b of the outer shell member 24. Lead portion 19a is connected to lead 19 as by crimping, and enclosed within a suitable insulating sleeve 19'. The resistance R is connected in series with conductor 18 and conductor portion 18a by suitable connections which are enclosed within insulating sleeves 18' and 18". The conductors 18 and 19 form a cable 32 which extends through a cable outlet 33 formed in the housing 21, which has bosses 33' which grip the cable 32 when the housing 21 is assembled. The central cavity 28 is pressure filled with a high viscosity two part epoxy resin which upon curing provides back-up sealing to the lead bushings 30a and 30b.

Referring to FIG. 2, the pressure sub-assembly 20 includes a low pressure operating point assembly 34, a high pressure point operating assembly 35, a contactor assembly 36, and a range spring assembly 37 which are enclosed within an inner shell 40, formed by an operating point cup member 41 and a range spring cup member 42, which in turn is enclosed within the outer shell 24.

The contactor assembly 36, basically comprises a switch which includes a movable contactor member 44 carried by a roll pin 45, and a contact plate 46 bearing printed contacts 47, the operation of which is controlled by the low and high pressure operating point assemblies 34 and 35 to complete a circuit, as a function of differential pressure supplied to the pressure sub-assembly 20 over the pressure inlets 16 and 17 thereof.

The range spring assembly 37 includes a range spring 39 which applies a bias force to the low pressure operating point assembly 34, which force being adjustable to permit selection of the value of differential pressure to which the switch 15 responds to connect the resistance R into the output circuit.

The low pressure operating point assembly 34 includes a low pressure diaphragm 48 and a low pressure operating point member 49. The low pressure operating point assembly 34 translates a force of fluid pressure supplied from the low pressure inlet 16 and the force of the range spring 39 as applied to the diaphragm and the low pressure operating point member 49 to the roll pin 45, moving the contactor member 44 towards the right, out of engagement with contacts 47 to effect the disconnection of the resistance R from the output circuit whenever the differential pressure is less than the set value as established by the range spring 39.

The high pressure operating point assembly 35 includes a high pressure diaphragm 50 and a high pressure operating point member 51 which serve to translate the force of fluid pressure supplied over the high pressure inlet 17 to the roll pin 45 to counteract the force of the low pressure operating assembly 34, moving the contactor 44 to the left into engagement with the contacts 47 on the contact plate 46 to connect the resistance R into the output circuit whenever the differential pressure is at least equal to the value set by the range spring 39.

Referring to the contactor assembly 36, the contact plate 46, shown in FIG. 10 comprises a generally circular substrate 66 of an insulating material, such as glass epoxy, having electrical contacts 47 disposed on a surface 67 thereof. Contacts 47 include two arcuate contact portions 68 and 69, which may comprise gold plated copper foil, disposed on surface 67 and which is coated with a silver silicone compound which provides initial make break point, with its surface tension healing arc burning, if any should occur. The contact portions 68 and 69 are separated by a channel 70 (FIG. 11) extending generally diagonally across the surface 67 of the substrate 66 as shown in FIG. 10. The arcuate contact portions 68 and 69 terminate in apertured land portions 71 defined by cutouts 72 along the peripheral edge of the substrate 66 in which are received suitable terminals 78 (FIG. 2), facilitating connection of the contact portions 68 and 69 to the ends of the leads 18a and 19a in a suitable manner, such as by soldering. The contact plate 46 has a central aperture 77 through which extends the contactor member 44 as shown in FIG. 2.

The contactor member 44 is of an electrical conductive material, such as brass, generally cylindrical and has a flange 79 at one end 80 which is disposed adjacent the conductor bearing surface 67 of the contact plate 46 and terminates in a gold plated knife-edge 82 which is disposed adjacent the contact bearing surface 67 of the contact plate 46. The contactor 44 is carried by the roll pin 45 which is supported at one end 84 by the low pressure operating point member 49 and at the opposite end 85 by the high pressure operating point member 51. The contactor member 44 is secured to the roll pin 45 in an insulating relationship by way of Nylon bushings 88, one disposed at each end of the contactor element 44.

The contact element 44, illustrated in FIG. 2 to be disengaged from the contact plate 46, is movable toward the left to permit the knife edge 82 to engage the printed conductors 47 carried on the plate 46 and interconnect lead portions 18a and 19a to connect the resistance R into the output circuit whenever the high pressure exceeds the low pressure plus the force of the range spring 39. The knife-edge 82 of the contactor 44 is moved out of engagement with the contacts 47 whenever the differential pressure is lower than the value set by the range spring 39. The separating channel 70 prevents tracking by the conductive coating applied to the knife-edge area of the contactor member 44.

The low pressure operating point assembly 34 and the high pressure operating point assembly 35 are disposed on opposite sides of the contactor assembly 36.

Considering the low pressure operating point assembly 34, the low pressure diaphragm 48, which may be of stainless steel, is a thin disc-like element which encloses an open end 90 of the operating point cup member 41, providing a fluid seal at the low pressure side of the contactor assembly 36. The diaphragm 48 is contoured, having a shoulder 73 which defines a concave center portion 74 for the diaphragm 48 as viewed from the low pressure inlet 16. The marginal edge 76 of the diaphragm 48 is clamped and sealed between the bottom surface 87 of a flange 85 of the range spring cup member 42 and a shoulder 93 of a disc-shaped spacer 92 of the assembly 34.

The spacer 92 is of a rigid insulating material and has an outer diameter which is slightly less than the diameter of the cup member 41 and is disposed within the cup member 41, spacing the low pressure operating point member 49 from the contact plate 46. The spacer 92 has a central aperture 95 which is countersunk adjacent an inward surface 94 of the spacer 92 which engages a surface 81 of the contact plate 46. The countersunk portion defines an opening 96 in which extends one end 77' of the contactor 44.

The pressure operating point member 49 comprises a disc-shaped element, which may be of steel, and is positioned within an opening provided by a recess 99 formed in a surface 98 of the spacer member 92.

The operating point member 49, which transmits forces applied to the low pressure diaphragm to the roll pin 45, has a recess 97 formed in one surface 100 in which is received the contoured center portion 74 of the diaphragm 48. The opposing surface 101 of the member 49 has a central raised portion 102 defining a shoulder 103 of a diameter greater than the diameter of the central aperture 95 of the spacer member 92 which serves as an under pressure limit stop. The raised portion 102, which extends within aperture 95 has a central opening 104 in which is received, by press fit, one end 84 of the roll pin 45.

Referring to the high pressure operating point assembly 35, the high pressure diaphragm 50, which is identical to the low pressure diaphragm 48, encloses the high pressure side of the contactor assembly 36, providing a fluid seal thereat. The diaphragm 50 is contoured, having a shoulder 105 which defines a convex center portion 106 for the diaphragm 50 as viewed from the high pressure inlet 17. The marginal edge 108 of the diaphragm 50 is clamped and sealed between an inner surface 109 of the operating point cup member 41 and a shoulder 110 of a spacer 112 of the assembly 35.

The spacer 112, which is identical to spacer 92 of the low pressure operating point assembly 34, is disposed within the cup member 41, spacing the high pressure diaphragm 50 from the contact plate 46. The spacer 112 has a central aperture 114 which is countersunk adjacent an inward surface 115 of the spacer 112 which engages the conductor bearing surface 67 of the contact plate 46. The countersunk portion defines an opening 116 in which extends the other end 80 of the contactor member 44.

The operating point member 51 comprises a frustoconical shaped element, which may be of steel. The operating point member 51, which transmits forces applied to the high pressure diaphragm to the roll pin 45, has its larger diameter end 120 received in contoured center portion 106 of the diaphragm 50. The lower diameter end 122 extends within an opening provided by a recess 124 formed in a surface 110 of the spacer member 112. The surface 122 of the member 51 has a central raised portion 126 defining a shoulder 128 of a diameter greater than the diameter of the central aperture 116 of the spacer member 112 which serves as an over pressure limit stop. The raised portion 126, which extends within aperture 116 has a central opening 130 in which is received, by press fit, the other end 85 of the roll pin 45.

The raised portion 126 of the operating point member 51 centers an over pressure limit spring 134 which extends around the roll pin 45 adjacent end 85 thereof and is compressed in position between the operating point surface 128 of member 51 and bushing 88.

The range spring assembly 37 is enclosed within the range cup member 42, which has a generally cylindrical body portion 187 terminating in a flared edge portion 189 bent over at its end defining the flange 85 which facilitates connection to the operating point cup member 41 and serves to clamp the marginal edge 76 of the low pressure diaphragm 48 between the flange 85 and spacer 92.

The range spring 39 comprises a helical spring member which is compressed between a spring retainer 140 and a nut 142 which is threaded on an adjustment screw 144. The spring retainer 140 which is positioned within the concave center portion 74 of the diaphragm 48 has a necked down portion 146 encircled by one end of the spring 39 which extends around the shank 150 of the adjustment screw 144. The nut 142 has lands 152, shown best in FIG. 3, which engage slots 153 in the main body portion of the cup member 42, to provide an anti-torque feature. The adjustment screw 144 has a slotted head portion 155 extending through an aperture 156 in cup member 42 and is disposed adjacent the low pressure inlet fitting 22 to permit adjustment of the bias force provided by the range spring 39. The adjustment screw 144 can be rotated by passing the blade of a screwdriver, for example, through a central passageway 160 in the low pressure fitting 22.

The operating point cup member 41, which forms part of the inner shell 40 and encloses the operating point assemblies 34 and 35 and the contactor assembly 36, is a hollow cylindrical member which may be of brass. The cup member 41 is open at one end 90 which is disposed adjacent the low pressure diaphragm 48 and has a stepped cover portion 166 terminating in an anular ridge 167 defining a passage 168 through which extends a central bored shank portion 170 of the high pressure fitting 23. The high pressure fitting 23 is secured to the cover member 41 as by soldering. The central bore 172 of the high pressure fitting 23 communicates with a sealed pressure chamber 174 defined by the inner surface 176 of cover portion 166 and the high pressure diaphragm 50.

Referring to FIGS. 8 and 9, the cup member 41 has an elongated inwardly extending triangular boss 180, which aligns the pressure diaphragms 48 and 50, spacers 82 and 112, and the contact plate 45 in the subassembly 20. The triangular boss 180 is received in matching triangular grooves in all the engaging parts of the operating point and contactor assemblies, such as groove 181 in the range spring housing (FIG. 5), groove 182 in the low pressure diaphragm 48 (FIG. 6), groove 183 in the spacer 92 (FIG. 7) and groove 184 in the contact plate 46 (FIG. 10). During assembly, each of the individual parts are oriented with alignment grooves, such as grooves 181-184 aligned relative to the boss 180 as shown in FIG. 4.

Referring to FIG. 2 and FIG. 9, which shows the cup member 41 prior to assembly, the elements of the low pressure operating point assembly 34, the high pressure operating point assembly 35 and the contactor assembly 36 are assembled together, forming an operating point assembly which is then slid into the inner cup member 41 through the open end 90 thereof. The contactor assembly 36 is assembled first, and the spacers 92 and 112 are then positioned on opposite sides of the contact plate 46. Then the operating point members 49 and 51 are pressed onto the roll pin 45. When the operating point assembly is positioned within the inner cup member 41, the open end 90 is enclosed by the range spring cup 42 which houses the range spring assembly 37, the spring retainer 140 being positioned within the concave portion 74 of diaphragm 48 and the range spring 39 encircling the raised portion 146 thereof as the cup 42 is moved into position. The diaphragms 48 and 50 of the operating point assemblies 34 and 35 define a sealed inner switch chamber 187 for the assembly 20.

The open end 90 of the cup member 41 has cutout portions 188 defining projections 190 which are bent over the flange 85 (FIG. 2) of the spring retainer cup 42 during assembly to lock the two part inner shell 40 together. Low pressure sealing is provided for the lead slots 194 in the diaphragm 74 and lead slots 192 in the spacer 92 by epoxy resin applied just prior to when projections 190 are bent over. The epoxy is applied adjacent the flange 85 of the cup member 42 at 231, and, when projections 190 are bent over, excess epoxy fills a cavity 232 defined by annular grooves 235 in spacer 92. The application of the epoxy resin may be separate or directly sequential with high temperature curing following.

Referring to FIGS. 2 and 7, the spacer 92 has a pair of countersunk slots 192 and 193 which define a cavity 192', shown in FIG. 2, for the lead terminals 78 of the contact plate 46 and permit passage of the lead portions 18a and 19a through the spacer 92, the lead portions passing through lead slots 194 in the low pressure diaphragm 48 (FIG. 6) and slots 195 in the flange of the spring cup member 42 (FIG. 5) and through bushings 30a and 30b to chamber 28 (FIG. 1) for connection to leads 18 and 19.

The outer shell member 24, which encloses the inner shell 40, is generally cylindrical in shape and is open at one end 201 adjacent the high pressure inlet fitting 23 and closed at the opposite end 202 adjacent the low pressure inlet fitting 22. The outer shell member 24, which may be of brass, has a main body portion 204 and a necked down portion 206 adjacent closed end 202 which defines a vertically extending surface 208 which is provided apertures 31a and 31b for receiving the lead bushings 30a and 30b (FIG. 3).

The inner shell assembly is inserted into the outer shell 24 through the open end 201 and the peripheral edge 205 of the outer shell 24 is bent over as shown in FIG. 2 to engage a shoulder 207 of the cup member 41 to lock the subassembly 20 together. Sealing at the high pressure side is provided by epoxy applied at 233 to fill a cavity 236 defined by annular grooves in spacer member 112, and by epoxy applied at 234 adjacent shoulder 207 of cup member 41. A portion 210 of the outer shell member 24 intermediate the main body portion 204 and the vertical surface 208 is of a reduced diameter defining the shoulder 27 which is engaged by the housing 21 as shown in FIG. 1. The inner surface 209 serves as a stop for the inner corner 211 of the cup member 41.

The closed end 202 of shell member 24 has an aperture 212 through which passes a cylindrical end portion 214 of the low pressure fitting 22 in a suitable manner such as by soldering. The low pressure fitting 22 may be a conventional brass fitting having an axial bore 60 providing a fluid inlet which communicates with an inlet 218 of a low pressure chamber 219 defined by spaced apart outer wall 220 of the range spring cup 42 and the inner wall 222 of the necked down portion 187 of the outer shell 24. Fluid flow from the low pressure chamber inlet 218 to the low pressure diaphragm 48 is provided by way of the hole 221 formed in the range spring cup 42 into inner compartment 224 defined by the inner wall 226 of the range spring cup memer 42 and the low pressure diaphragm 48.

OPERATION

Referring to FIG. 1, in the illustrative embodiment wherein the differential pressure cutout switch 15 is employed in a protection control system for a refrigeration compressor, the low pressure inlet fitting 22 is connected in fluid communication with a fluid outlet of a crankcase of the compressor unit and the high pressure inlet fitting 23 is connected in fluid communication with a fluid outlet of an oil pump of the compressor unit. Thus, crankcase oil pressure is extended to the low pressure inlet 16 and oil pump pressure is extended to the high pressure inlet 17.

The cable 32, including leads 18 and 19, is extended to a suitable control device, such as the pressure discriminator of the sensor controller disclosed in my copending application referenced above.

Referring to FIG. 2, low pressure fluid enters through the fitting 22 to be entrapped within the outer shell 24 and the inner shell 40, the bushings 30a and 30b, and the low pressure diaphragm 48. Passage through the range spring cup 42 is provided by the hole 221. The force generated by this low pressure fluid pressure on the diaphragm 48 plus the force exerted by the range spring 39 is passed by the low pressure operating point 49 and the roll pin 45 to the high pressure operating point 51 for counterbalancing by high pressure fluid pressure acting on the high pressure diaphragm 50. If this high pressure force does not counterbalance, indicating that the differential pressure is less than the value set by the range spring, the operating point member 49 and roll pin 45 are moved towards the right, and the large diameter shoulder 101 on the low pressure operating point member 49 engages the low pressure spacer 92, acting as an underpressure limit stop.

The extension 102 on the low pressure operating point member 49 engages insulating bushing 88, moving the contactor 44 away from the contact plate 46, opening the circuit between lead portions 18a and 19a such that an open circuit appears between leads 18 and 19.

High pressure fluid enters through fitting 23 and when the force on the high pressure diaphragm 50 exceeds the low pressure and range spring force, high pressure operating point 51 and roll pin 45 move to the left. The contactor member 44 is also moved to the left under the force of spring 134 until the knife edge 82 engages the conductors 47 on the contact plate 46, bridging contact portions 68 and 69 (FIG. 10) to complete a circuit between conductor portions 18a and 19a whereby resistance R is connected in the output circuit provided by conductors 18 and 19. The differential pressure required for contact engagement can be selected by rotation of the adjustment screw 144, positioning the nut 142 to compress the range spring 39.

Further increase in high pressure causes the high pressure operating point 51 to move to the left until shoulder 128 engages the spacer 112, preventing further deflection of the diaphragm 51 and absorbing continued overpressure forces. The contactor member 44 stays at low level force engagement as the overtravel spring 134 absorbs the overtravel of the operating point member 51.

In the illustrative embodiment wherein the differential pressure cutout switch 15 is employed with the electronic sensor controller, the external or lead resistance changes from an infinite value (open circuit condition) for under pressure conditions to a finite value (closed circuit condition) when the differential pressure is at least equal to the set value. Since the sensor controller has a very high input impedance, in the megohm range, the variation in internal contact resistance from initial closure to fully closed over micro inches of movement is insignificant.

Also, the sensor controller is operable when enabled to integrate the time for which an open circuit condition appears between leads 18 and 19 and thus, if the differential pressure monitored by the switch 15 oscillates, rapidly or otherwise, across the threshold setting for the sensor controller, the sensor controller integrates this oscillation. In the exemplary embodiment wherein the differential pressure is lube oil pressure, the differential pressure cutout switch 15, when employed with the sensor controller, enables distinguishing between adequate, marginal and inadequate lube oil pressure.

The sensing switch construction provides double sealing to low pressure fluid by way of epoxy at locations 231 and 232 and triple sealing to high pressure fluid by way of epoxy at locations 232-234. The epoxy at locations 233 ajacent the high pressure diaphragm 50 and the epoxy at location 232 adjacent the low pressure diaphragm 48 seal off the two ends 90 and 166 of the inner cup member 41 define switch chamber 187 in which the contactor assembly 36 is located and provide fluid isolation to the chamber 187. The switch chamber 230 remains in the atmosphere in which it was sealed in. Accordingly, pressure variations caused by ambient temperatures are cancelled by acting on both diaphragms 48 and 50.

If either diaphgram 48 or 50 ruptures, the normal switching function continues unless or until the contacts 47 on contact plate 46 become contaminated to a degree where circuit closure cannot occur. If both diaphrams 48 and 50 rupture, the fluid, generally freon in the exemplary embodiment wherein the switch 15 is employed in a refrigeration system, is not lost to atmosphere but rather flows through the switch 15 from the high pressure inlet 17 to the low pressure inlet 16.

While in an exemplary embodiment the differential pressure cut out switch 15 is described as being operable to monitor two pressures supplied over respective low pressure inlet 16 and high pressure inlet 17, it is apparent that with modification, a reference pressure could be supplied to one inlet, such as the low pressure inlet 16 and a single variable pressure to be monitored, could be supplied to the high pressure inlet 17. For example, the low pressure inlet fitting 22 and the outer shell member 24 may be modified for single pressure operation by venting to atmosphere to provide a "gauge" reference. Alternatively, the low pressure chamber may be evacuated and sealed to provide an "absolute" reference pressure. The switch 15 is operable in the manner described above except that the switching function of the pressure sensing switch 15 is controlled by the difference between the variable pressure supplied over the high pressure inlet 17 and the reference pressure provided at the low pressure inlet 16.

I claim:

1. In a differential pressure sensing device operable to provide first and second control outputs as a function of the difference between first and second pressures supplied to first and second pressure inlets thereof, said sensing device comprising housing means, first pressure operating point means including a first pressure diaphragm disposed within said housing means enclosing a first portion of said housing means adjacent one end thereof to define a first pressure chamber, second pressure operating point means including a second pressure diaphragm disposed within said housing means enclosing a second portion of said housing means adjacent another end thereof to define a second pressure chamber, said first and second pressure diaphragms defining a third chamber intermediate said first and second chambers, said first and second operating point means including respective first and second operating point members disposed in said third chamber adjacent the center portion of said first and second diaphragms, respectively, spacer means enclosed within said housing means and located in said third chamber, the peripheral edges of said first and second diaphragms being clamped between said spacer means and an inner surface of said housing means, operator means mechanically coupled to said first and second operating point members, said first and second operating point members transferring the force provided on said diaphragms by the pressures in said first and second chambers to said operator means to move said operator means between first and second positions as a function of the difference in pressures established in said first and second chambers, said spacer means cooperating with said first and second operating point members to limit movement of said operator means as a function of the difference between said first and second pressures, and contactor switch means including switch actuator means coupled to said operator means to operate said switch means to provide said first control output whenever said operator means is at a position other than said one position.

2. A pressure sensing device as set forth in claim 1 wherein said spacer means includes first and second cylindrical spacer members disposed within said third chamber and having peripheral edge surfaces, and wherein said housing means has first and second surface portions extending inwardly adjacent said edge surfaces of said first and second spacer members, the marginal edge of said first diaphragm being clamped between the peripheral edge of said first spacer member and said first surface portion, and the marginal edge of said second diaphragm being clamped between the peripheral edge of said second spacer member and said second surface portion.

3. A pressure sensing device as set forth in claim 1 wherein said contactor switch means includes a contact plate of an insulating material having first and second contact portions disposed on a surface thereof, and connected to outputs of said device, said switch means including a contactor member coupled to said operator means for movement relative to said contact plate, said contactor member being moved toward said contact plate to bridge said contacts to complete a circuit between said outputs of said device whenever said operator means is at one of said positions, said contactor member being maintained out of engagement with said contact portions to interrupt the circuit between said outputs whenever said operator means is moved from said one position.

4. A pressure sensing device as set forth in claim 3 wherein said contactor member comprises a cylindrical member having a main body portion extending through a central aperture of said contact plate and having a flange portion at one end thereof terminating in a knife-edge surface which extends adjacent said contact bearing surface of said contact plate.

5. A pressure sensing device as set forth in claim 4 wherein said contacts comprise electrically conductive material having a coating of a silver silicon compound, and wherein said contact plate has a separating channel formed in said surface separating said first and second contact portions.

6. A pressure sensing device as set forth in claim 1 wherein said spacer means includes first and second spacer members each having countersunk center portions disposed adjacent said first and second diaphragms, respectively, said operator means including an operator member supporting said first and second operating point members within said countersunk portions of said first and second spacer members, respectively, said first operating point member being moved to engage a shoulder formed on a first surface of said first spacer member to limit the travel of said operator member whenever the difference between said second and first pressures exceeds a first value, said second operating point member being moved to engage a shoulder formed on a surface of said second spacer member to limit the travel of said operator member whenever the difference between said first and second pressures exceeds a second value.

7. In a differential pressure sensing device operable to provide first and second control outputs as a function of the difference between first and second pressures supplied to first and second pressure inlets thereof, said sensing device comprising housing means including a generally cylindrical inner shell member and an outer shell member enclosing said inner shell member, first pressure operating point means including a first pressure diaphragm disposed within said inner shell member and enclosing a first portion of said inner shell member adjacent one end thereof to define a first pressure chamber, second pressure operating point means including a second pressure diaphragm disposed within said inner shell member and enclosing a second portion of said inner shell member adjacent another end thereof to define a second pressure chamber, said first and second pressure diaphragms defining a third chamber intermediate said first and second chambers, operator means mechanically linking said first and second operating point means and movable thereby between first and second positions as a function of the difference in pressures established in said first and second chambers, said outer shell member having an inner surface disposed in spaced relationship with an outer surface of said inner shell member adjacent said one end, defining a fluid passageway from said first inlet to said first chamber, and said outer shell member and said inner shell member each having openings adjacent said other end, defining a fluid passageway from said second inlet to said second chamber, and contactor switch means including switch actuator means coupled to said operator means to operate said switch means to provide said first control output whenever said operator means is at one of said positions, and to provide said second control output whenever said operator means is moved from said one position to said other position.

8. A pressure sensing device as set forth in claim 7 which includes resistance means, said contactor switch means being operable to connect said resistance means between said outputs of said device whenever said operator means is at one of said positions.

9. A pressure sensing device as set forth in claim 8 wherein said housing means includes an outer housing member enclosing a portion of said outer shell member adjacent said one end thereof, defining a cavity, said resistance means being disposed within said cavity.

10. A pressure sensing device as set forth in claim 7 which includes range spring adjust means including a range spring for applying a force to said first operating point means, and means for adjusting the force applied to said first operating point means by said range spring.

11. In a differential pressure sensing device operable to provide first and second control outputs as a function of the difference between first and second pressures supplied to first and second pressure inlets thereof, said pressure sensing device comprising first housing means, a first pressure diaphragm disposed within said first housing means and enclosing a first portion of said first housing means adjacent a first end thereof to define a first pressure chamber, a second pressure diaphragm disposed within said first housing means and enclosing a second portion of said first housing means adjacent a second end thereof to define a second pressure chamber, said first and second pressure diaphragms defining a third chamber intermediate said first and second chambers, first and second operating point members disposed in said third chamber in contact with respective ones of said first and second pressure diaphragms, and an operator member extending within said third chamber and mechanically linking said first and second operating point members, second housing means enclosing said first housing means and having an inner wall portion adjacent said first end of said first housing means disposed in spaced relationship with a portion of an outer wall of said first housing means defining a fluid passageway between said first pressure chamber and said first pressure inlet to permit fluid at a first pressure supplied over said first inlet to be directed to said first pressure diaphragm providing a force which is transmitted to said operator member over said first operating point member, said first and second housing means each having openings adjacent said second end of said first housing means defining a fluid passageway between said second pressure chamber and said second pressure inlet to permit fluid at a second pressure supplied over said second inlet to be directed to said second pressure diaphragm providing a force which is transmitted to said operator member over said secod operating point member for counteracting the force transmitted thereto by said first operating point member whereby said operator member is moved between first and second positions as a function of the difference in pressures in said first and second chambers, and contactor switch means disposed within said third chamber and including a contact plate member having electrical contacts disposed on a surface thereof, and a contactor member coupled to said operator member for movement relative to said contact plate, said contactor member being moved toward said contacts to bridge said contacts whenever said operator member is at one of said positions, said contactor member being maintained out of engagement, with said contacts whenever said operator member is moved from said one position towards said other position.

12. A pressure sensing device as set forth in claim 11 which includes range spring means disposed within said first chamber and including a range spring member for applying a force to said first diaphgram, and means for adjusting the force applied to said first diaphragm by said range spring.

13. A pressure sensing device as set forth in claim 11 which includes a first cylindrical spacer member disposed within said third chamber between said first diaphragm and a further surface of said contact plate, and a second spacer member disposed within said third chamber between said second diaphragm and said contact bearing surface of said contact plate, and wherein said first housing means has a first surface portion extending inwardly adjacent a marginal edge of a first surface of said first spacer member, said first housing means having a second surface portion extending inwardly adjacent a marginal edge of a first surface of said second spacer member, the marginal edge of said first diaphragm being clamped between said marginal edge of said first spacer member and said first surface portion of said first housing means, and the marginal edge of said second diaphragm being clamped between said marginal edge of said second spacer member and said second surface portion of said first housing means.

14. A pressure sensing device as set forth in claim 13 wherein said first surface of said first spacer member has a countersunk center portion, and wherein said first surface of said second spacer member has a counter sunk center portion, said first and second operating point members being supported by said operator member within said countersunk portions of said first and second spacer members, respectively, said first operating point member being moved to engage a shoulder formed on said first surface of said first spacer member to limit the travel of said operator member whenever the force applied to said first diaphragm exceeds the force applied to said second diaphragm by a predetermined amount, said second operating point member being moved to engage a shoulder formed on said first surface of said second spacer member to limit the travel of said operator member whenever the force applied to said second diaphragm exceeds the force applied to said first diaphragm member by a predetermined amount.

15. A pressure sensing device as set forth in claim 14 wherein said first and second spacer members each have a central aperture, said operator member comprising a pin member extending through said apertures and having first and second ends secured to said first and second operating point members, respectively.

16. A pressure sensing device as set forth in claim 15 wherein second surfaces of said first and second spacer members have contersunk portions adjacent said central apertures which define a cavity adjacent a central aperture of said contact plate, said contactor member comprises a cylindrical member disposed within said cavity and having a main body portion extending through the aperture in said contact plate and a flange portion extending adjacent the contact bearing surface of said contact plate which terminates in a knife-edge providing a contact surface, said contactor member being carried by said pin member in insulating relationship and movable therewith to permit said contact surface to engage said contacts whenever said pin member is moved to said one position.

17. A pressure sensing device as set forth in claim 13 wherein said first housing means has an inwardly extending boss which cooperates with grooves formed in said first and second diaphragms, said first and second spacer members and said contact plate for alligning said first and second diaphragms, said first spacer members and said contact plate within said first housing means.

* * * * *